United States Patent [19]

Williams, Jr. et al.

[11] 4,455,558

[45] Jun. 19, 1984

[54] COMBINED ANALOG DIGITAL SYMBOLS

[76] Inventors: Albert J. Williams, Jr., 901 Llanfair Rd., Ambler, Pa. 19002; Raymond C. Machler, 1807 Old Forty Foot Rd., Harleysville, Pa. 19438

[21] Appl. No.: 419,130

[22] Filed: Sep. 17, 1982

Related U.S. Application Data

[63] Continuation of Ser. No. 260,973, May 6, 1981, abandoned.

[51] Int. Cl.³ .................. G01G 9/08

[52] U.S. Cl. .................. 346/1.1; D18/26; 283/1 A; 340/722; 346/66

[58] Field of Search .................. 346/1.1, 66, 23; 283/1 R, 1 A; 382/69, 11, 12; 178/30, 113; 235/494; 434/205; 340/722; 400/103, 104; D18/24, 26

[56] References Cited

U.S. PATENT DOCUMENTS

| | | | |
|---|---|---|---|
| 2,516,217 | 7/1950 | Keinath | 346/66 X |
| 3,039,101 | 6/1962 | Perdue | 346/1.1 |
| 3,214,764 | 10/1965 | Williams | 346/66 X |
| 3,550,148 | 12/1970 | Machler | 346/1.1 |
| 3,845,279 | 10/1974 | Rosdorff | 235/494 |
| 4,031,562 | 6/1977 | Holzbrecher | 346/66 X |
| 4,283,723 | 8/1981 | Bickley | 340/722 |

*Primary Examiner*—Joseph W. Hartary
*Attorney, Agent, or Firm*—Woodcock, Washburn, Kurtz, Mackiewicz & Norris

[57] ABSTRACT

There is disclosed a process for displaying numerical information in symbolized digital form while providing by the same symbolizing an analog presentation of changes in the information being displayed. According to the invention, numbers are represented by modifications of a row of six dots in which symbolizations of the digits are effected by either (a) positioning a dot above or below the row of six dots at a predetermined location indicative of a particular numeral from zero through nine, or (b) by adding one dot or deleting no more than two dots in the row of six dots in a predetermined pattern to represent a particular numeral from zero through nine.

14 Claims, 10 Drawing Figures

TABLE I

COST OF LIVING INDEX

U.S. Bureau of Labor Statistics 1967 100

| | Jan. | Feb. | Mar. | April | May | June | July | Aug. | Sept. | Oct. | Nov. | Dec. | Avg. |
|---|---|---|---|---|---|---|---|---|---|---|---|---|---|
| 1979 | 204.7 | 207.1 | 209.1 | 211.5 | 214.1 | 216.6 | 218.9 | | | | | | |
| 1978 | 187.2 | 188.4 | 189.8 | 191.5 | 193.3 | 195.3 | 196.7 | 197.8 | 199.3 | 200.9 | 202.0 | 202.9 | 195.4 |
| 1977 | 175.3 | 177.1 | 178.2 | 179.6 | 180.6 | 181.8 | 182.6 | 183.3 | 184.0 | 184.5 | 185.4 | 186.1 | 181.5 |
| 1976 | 166.7 | 167.1 | 167.5 | 168.2 | 169.2 | 170.1 | 171.1 | 171.9 | 172.6 | 173.3 | 173.8 | 174.3 | 170.5 |
| 1975 | 156.1 | 157.2 | 157.8 | 158.6 | 159.3 | 160.6 | 162.3 | 162.8 | 163.6 | 164.6 | 165.6 | 166.3 | 161.2 |
| 1974 | 139 7 | 141 5 | 143 1 | 143 9 | 145 5 | 146 9 | 148 0 | 149 9 | 151.7 | 153 0 | 154 3 | 155 4 | 147.7 |
| 1973 | 127 7 | 128 6 | 129 8 | 130 7 | 131 5 | 132 4 | 132 7 | 135 1 | 135 5 | 136 6 | 137 6 | 138 5 | 133 1 |
| 1972 | 123 2 | 123 8 | 124 0 | 124 3 | 124 7 | 125 0 | 125 5 | 125 7 | 126 2 | 126 6 | 126 9 | 127 3 | 125.3 |
| 1971 | 119 2 | 119 4 | 119 8 | 120 2 | 120 8 | 121 5 | 121.8 | 122 1 | 122.2 | 122 4 | 122 6 | 123 1 | 121 3 |
| 1970 | 113.3 | 113 9 | 114 5 | 115 2 | 115 7 | 116 3 | 116.7 | 116 9 | 117 5 | 118 1 | 118 5 | 119 1 | 116.3 |
| 1969 | 106 7 | 107 1 | 108.0 | 108 7 | 109 0 | 109 7 | 110.2 | 110 7 | 111.2 | 111 6 | 112.2 | 112 9 | 109 8 |
| 1968 | 102 0 | 102 3 | 102.8 | 103 1 | 103 4 | 104 0 | 104.5 | 104.8 | 105.1 | 105 7 | 106.1 | 106.4 | 104.2 |
| 1967 | 98 6 | 98 7 | 98 9 | 99.1 | 99.4 | 99 7 | 100 2 | 100.5 | 100 7 | 101.0 | 101.3 | 101.6 | 100.0 |

COMBINED ANALOG DIGITAL SYMBOLS

This is a continuation, of application Ser. No. 260,973, filed May 6, 1981, now abandoned.

FIELD OF THE INVENTION

This invention proposes a system for the display and/or recording of numbers utilizing symbols which have analog connotation as well as digital connotation.

BACKGROUND OF THE INVENTION

Previously a wide variety of ways have been used to represent numerical data. The ancient Romans used their letter symbols to write numbers. When we use this method today we call them Roman numerals. History also tells us that in the ninth century A.D. an unknown Hindu devised a method using ten new symbols. He did not use a new symbol for ten as the Romans did but used the one symbol spaced to the left of the nine symbol and replaced the nine symbol with a zero symbol. This was a significant advance. When we use this method today we call the numbers Arabic numerals.

A set of ten new symbols has recently been devised to print our account number on our checks in magnetic ink so the number can readily be read by machine. It is wise to learn to read these symbols because these symbols are also used to write the amount of the check in dollars and cents, just to the right of the account number, again with magnetic ink, so the amount can be read by machine.

Another variation of the ten Arabic symbols is found on packages of items sold in stores. It is an array of parallel lines, some thin and some thick, which can be read by a photoelectric device. These symbols have been referred to as bar codes.

It is the belief of the inventors that there is need for still another variation of the Arabic symbols, which would have an analog connotation, so that one can look at a series of numbers and immediately see trends and other changes of interest to him.

Processes have been devised for the purpose of recording digital information in analog form. U.S. Pat. No. 3,039,101 to Perdue discloses a method for plotting digital data with analog connotation. The patent discloses the plotting of three decades of information. The most significant decade determines the position of the marking on the chart. The decade of next significance determines the size of the symbol thus refining the analog connotation. The decade of least significance determines the size of a symbol in the margin which allows more resolution if needed. The maximum size of the Perdue symbol is ten dots with nine spaces therebetween. A chart size ten times the maximum symbol size is required for a full decade of most significance. U.S. Pat. No. 3,550,148 to Machler uses a symbol having a maximum size of only five dots with four spaces therebetween. Since this symbol size is only half the size of the Perdue symbol the amount of chart required for the decade of next greater significance is only half that required by Perdue. This permits Machler to include positioning from a decade of still greater significance and so record three decades of information without placing any of the information in the margin. U.S. Pat. No. 3,214,764 to Williams discloses a different method for plotting digital data with analog connotation. The disclosure shows five decades while using less chart space than Perdue and Machler, showing three decades. The Williams method uses, in part, the teaching of the ninth century Hindu by making multiple use of a set of symbols. It differs from the Hindu method by using twenty symbols instead of only ten. All of the twenty symbols have the same size, equivalent to 41 dots with 40 spaces therebetween. The reason for twenty symbols rather than ten is to give a smoother curve in each decade.

SUMMARY AND OBJECTS OF THE INVENTION

This invention comprises a system for displaying successive magnitudes of a quantity in analog form using, as required, any one of ten symbols each of which corresponds to one of the Arabic digits zero through nine inclusive, the method comprising the steps of establishing the maximum width of all symbols by using a row of six dots extending from left to right with five equal spaces therebetween, thus establishing eleven quantized locations, sequentially selecting and identifying ten of these locations, the identification for each location being accomplished by a modification of the row of six dots by adding one dot or deleting a maximum of two dots, to form a symbol of such conformity in width that it can be stacked with similar symbols to form a well defined column, and making the modifications for forming the symbols in such a way that any changes in magnitude of the quantity displayed by the symbols in the column are apparent in analog form without the use of arithmetic.

The invention further consists of placing at least one additional symbol to the left or right of the original symbol or any subsequent symbol in that column with spacing greater than that between the row dots, in order to add decades of greater or lesser significance, as is the custom with conventional Arabic digits. Using this technique for numerical information, successive values of a numerical quantity, such as the Consumer Price Index, may be quickly scanned for significant changes without the use of arithmetic.

The invention is based upon a row of six dots, also called a decade, which are horizontally aligned with equal spaces therebetween. The row is modified to form symbols which represent a digit of numerical information or magnitude. A plurality of these rows horizontally aligned with greater spacing therebetween may be used to represent numerical information or magnitudes having more than one digit, e.g., one row of six dots for each power of ten to be represented. These horizontal rows may be aligned vertically to form a plurality of columns so as to represent numerical information of a quantity, e.g. Consumer Price Index, in digital form but with an analog appearance. The modification of a row of six dots may be accomplished by the manipulation of an information dot in a predetermined area above or below a row of six dots, or alternatively, it may be accomplished by the addition of a dot or deletion of one or two dots in the same row wherein the group of six dots is originally found.

In one embodiment the modification of the row of six dots may be made in the same line as the row dots, specifically a dot is added in one of the spaces between the row dots for the odd Arabic digits 1&3&5&7&9 and a row dot is emphasized by deletion of any neighboring row dot for the even Arabic digits 0&2&4&6&8.

In another embodiment the modification is limited to the addition of a single dot located just above one of the row dots for one of the even Arabic digits 0&2&4&6&8, when so required, or, when so required, located just above one of the spaces between the row dots for one of the odd Arabic digits 1&3&5&7&9.

The invention further specifies symbols and the way they can be used when the value being symbolized makes an excursion into the negative domain, and it does this in a way which avoids any discontinuity in the slope or rate of change of the quantity being symbolized. This is done using for negative numbers symbols which are the reverse of the positive symbols. It is convenient to think of these negative symbols as mirror images of the positive symbols, except that it happens that the negative five symbol is the same as the positive five symbol.

The unknown Hindu who gave us the Arabic number system and the symbols to execute this system was wise to design the symbols so they would fit into the same space as the letters. If he had proposed symbols which were wider than the letters (even though not as high) the symbols and his whole number system might have been rejected and that would have been a great loss to the world. Now however eleven centuries later there is no danger that an additional set of symbols will weaken the Arabic number system. Otherwise stated the inherent strength of the Arabic number system has never yet been fully realized because of the lack of a set of symbols such as are being proposed.

The systems and numerical displays which are the subject of this invention may be constructed in a variety of sizes and are useful in a wide range of applications relating to representing and recording numerical data.

It is, therefore, an object of the present invention to provide a new and useful system for representing digital information is an accurate manner while at the same time providing an analog representation of the changes in the digital information.

It is another object of this invention to provide a recording process utilizing digital information recorded in decade form wherein each decade comprises a horizontal row of six dots with approximately equal spaces therebetween, and numerical representations are made by a modification of the row of six dots by adding one dot or deleting a maximum of two dots as needed.

It is a further object of this invention to provide a digital/analog system capable of representing negative numbers.

It is an additional object of this system to provide a digital/analog system capable of being plotted by any one of a variety of means such as a cathode ray tube (CRT) or by a printer for a computer with graphics, braille recording styli, or by pen, pencil or transfer characters or by a special typewriter.

These and other objects of the invention will become apparent upon an examination of the hereinafter described figures and the accompanying explanation.

DETAILED DESCRIPTION OF THE PREFERRED EMBODIMENTS

Figure 1:
FIG. 1 shows a row of six dots at the left, and a second row of six dots with a magnification of two at the right.

This invention is based upon a row of six dots extending from left to right with five equal spaces therebetween as shown in FIG. 1. The row of six dots at the left is large enough to allow visual resolution of the individual dots at normal reading distance from the eye. The row at the righ has been enlarged (or magnified) by a factor of two. With this enlargement it can be observed that the dots are square. The separation between the dots is equal to the width of the dots so the spaces also appear to be square. These proportions seem to allow resolution of the dots by the eye with the least effort. These proportions are preferred but are not absolutely essential.

Figure 2:
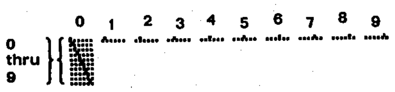
FIG. 2 shows horizontal and vertical representation of digits zero through nine using a first embodiment of this invention in which a series of ten grids or decades each comprising six dots with approximately equal spaces therebetween are used, each decade having been modified with the addition of a single dot just above one of the row dots or row spaces to represent a particular numeral.
Figure 3:
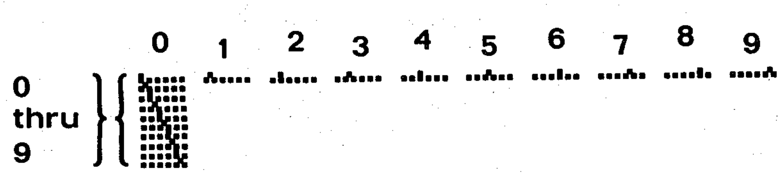
FIG. 3 is the same representation shown in FIG. 2 but with a magnification of two to facilitate inspection of the symbols.

FIG. 2 and FIG. 3 show a horizontal and vertical representation of a first embodiment of this invention in which the modification of the row of six dots is limited to the addition of a single information dot located just above one of the row dots for one of the even Arabic digits 0&2&4&6&8, when so required, or, when so required, located just above one of the spaces between the row dots for one of the odd Arabic digits 1&3&5&7&9. Each symbol in the horizontal line has the corresponding Arabic digit above it with even digits slightly elevated above the odd digits. Going across the horizontal row from left to right, the digit zero is represented by placing an information dot directly above the dot at the extreme left side of the decade. The digit "1" is represented by placing an information dot directly above the space between the first two dots on the left side of the decade. The digit "2" is represented by placing the information dot above the dot that is second from the left in the decade. The remaining digits 3,4,5,6,7,8 and 9 are represented by continuing this pattern of moving the information dot to a position over the next dot or space in sequence. Thus, for the "three" symbol an information dot is placed above the next-to-left of five spaces. For the "four" symbol an information dot is placed above the dot just-left-of the center space. For the "five" symbol an information dot is placed above the center space. For the "six" symbol, an information dot is placed above the dot just-right-of center space. From the "seven" symbol an information dot is placed above the next-to-right of five spaces. For the "eight" symbol an information dot is placed above the next-to-right of six row dots. For the "nine" symbol an information dot is placed over the right of five spaces.

For the even symbols in the horizontal row the added dot seems to join to the row dot beneath it to form an "I". For the odd symbols in the horizontal row the added dot seems to join with the two dots at its bottom corners to form the lower portion of an "X". The zero symbol forms the left end of the horizontal line of symbols and it also forms the top of the column of symbols. In the column there can be seen, even at a distance, a diagonal line extending from the upper left to the lower right. This is a demonstration of the analog connotation of the symbols.

In order to check the digital connotation of any symbol in the column it is helpful to place the edge of a white card just under any row of dots. Above this row there can be seen an "I" or an "X". If it is an "I" the symbol is one of only five even symbols and the position of the "I" with respect to an edge or the center of the column tells which of the five it is. If it is an "X" that is seen above the row then the symbol is one of only five odd symbols and the position of the "X" with respect to an edge or the center of the column tells which of the five it is.

FIG. 3 is the same representation as shown in FIG. 2 but with a magnification of two. While FIG. 2 shows a preferred size for constructing the symbols of this invention, FIG. 3 shows that these symbols may be used in a variety of sizes.

Figure 4:
FIG. 4 shows a second embodiment of the system of this invention, wherein digits zero through nine are represented (and repeated) by the addition of one dot or deletion of no more than two dots in the same row as the original six dots.

FIG. 4 shows a second embodiment of the invention. The top row of dots is the symbol for zero and then progressing downward are the symbols for one through nine and then again zero through nine. A study of FIG. 4 shows a path starting from the upper left corner and proceeding down and to the right, for the upper half of the figure, and then again for the lower half of the figure. The fact that this path can be perceived and that it is essentially straight is evidence of the analog connotation of this set of symbols. It is also a fact that each of the ten symbols is different from all the others and the viewer can learn the digit corresponding to each symbol, therefore each symbol has a digital connotation. These two facts tell us that the set of symbols shown in FIG. 4 do indeed have analog and digital connotation.

A detailed study of FIG. 4 discloses how each symbol is formed. The row of six dots (preferably square), with five equal spaces therebetween, establishes eleven possible quantized locations for an information dot. Only ten of these are used in FIG. 4. For the zero symbol the information dot is superimposed on the left of six dots and to emphasize this location the only neighboring dot is deleted, thus leaving only five dots as shown. For the one symbol the information dot is positioned in the left of five spaces thus making a dash three dots wide and leaving only four square dots as shown. For the two symbol the information dot is superimosed on the next-to-left of six dots and to emphasize this location the two neighboring dots are deleted, thus leaving only four dots as shown. For the three symbol the information dot is positioned in the next-to-left of five spaces thus making a dash three dots wide and leaving only four square dots as shown. For the four symbol the information dot is superimposed on the dot just-left-of center space and to emphasize this location the two neighboring dots are deleted, thus leaving only four dots as shown. For the five symbol the information dot is positioned in the center-of-five spaces thus making a dash three dots wide and leaving four square dots as shown. For the six symbol the information dot is superimosed on the dot just-right-of center space and to emphasize this location the two neighboring dots are deleted thus leaving only four dots as shown. For the seven symbol the information dot is positioned in the next-to-right of five spaces, thus making a dash three dots wide and leaving only four square dots as shown. For the eight symbol the information dot is superimposed on the next-to-right of six dots and to emphasize this location the two neighboring dots are deleted, thus leaving only four dots as shown. For the nine symbol the information dot is positioned in the right-of-five spaces, thus making a dash three dots wide and leaving four square dots as shown.

It will be observed that the symbols for the even numbers all have an isolated dot and the symbols for the odd numbers all have a dash. In looking at any symbol it is immediately apparent whether it is for an even or odd number. Since there are only five even numbers it is easy to determine which even number it is by the location of the isolated dot. Also since there are only five odd numbers it is easy to determine which odd number it is by the location of the dash.

For example a dash in the center of a symbol cannot be a 3 or a 7 so it must be a 5. Also, for example, an isolated dot just to the left of the center in a symbol cannot be a 6 or a 2 so it must be a 4.

Each symbol of FIG. 4 may be classified as a single dimension or single track symbol since it is the same from top to bottom as is each symbol of the "bar code" mentioned earlier in this disclosure. Such symbols can be handled by less complicated methods than those used for encoding checks (mentioned earlier) with codes which are not single dimension symbols. In order to further simplify scanning the height of the symbols of FIG. 4 may be augmented.

Figure 5:
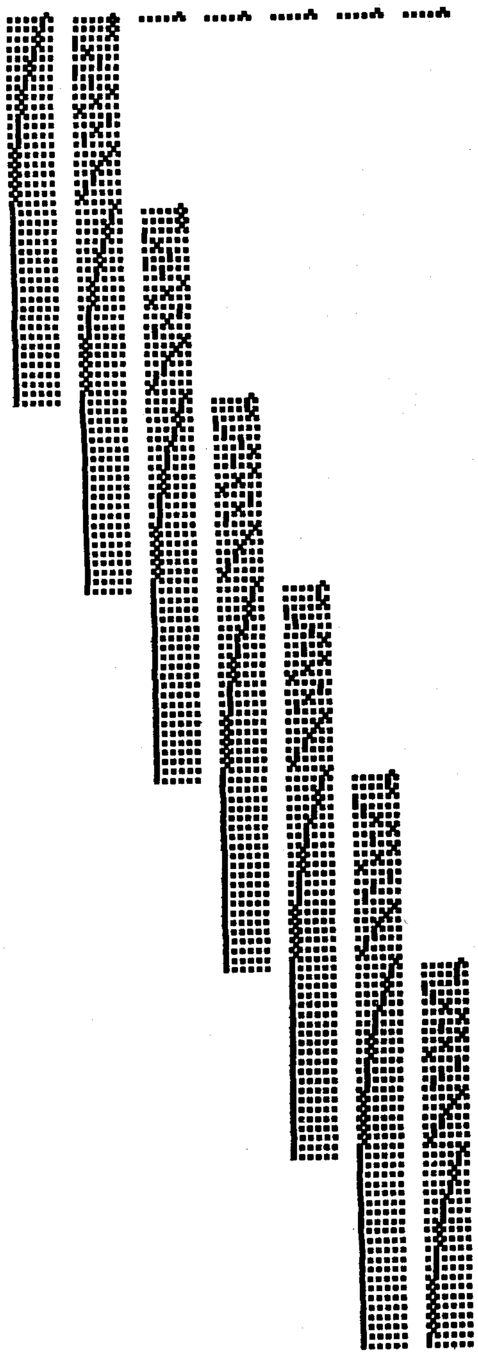
FIG. 5 shows the first embodiment of this invention used to represent significant portions of a decaying exponential function.

FIG. 5 shows a decaying exponential as represented in accordance with the first embodiment of this invention in which the modification of the row of six dots is accomplished by adding an information dot just above one of the row dots or just above one of the spaces between the row dots.

The top row shows seven "nines", the left nine being the most significant and the right nine being the least significant, as is the custom with conventional Arabic digits. After 20 steps the most significant number has decreased to zero. A curve has been drawn from nine to zero but it is not a straight line. It is a curved line. If the eye is then moved one column to the right it is at nine and then after 20 steps the number has decreased to zero. A curve has been drawn from nine to zero but it is a curved line very similar in shape to the curve already drawn in column one for the most significant digit. When column two reaches zero, column three is at nine and it then decreases to zero drawing the same curve for the third time.

The process is successively repeated for columns four, five, six and seven so all the columns are at zero and thereafter remain at zero. In order to reduce the work, the lower portions of columns 1, 2, 3, 4 and 5 have not been completed to the bottom of the page since completion would not have contained any new information. Also in order to reduce work, gaps have been left in columns 3, 4, 5, 6 and 7 where the information is not significant.

Those familiar with mathematical functions will recognize that this is a decaying exponential. It is significant that this can be recognized without arithmetic, written or mental. This is the result of the analog connotation of these symbols.

The multiplier (which was used 140 times) was 0.8912 and the multiplication was done on a hand-held ten place printing calculator (Hewlett Packer, Model HP 19C). The first seven digits on the printed tape were used to obtain the values for FIG. 5.

There is additional information in FIG. 5 more readily gleaned because of the analog connotation of the symbols. The most significant digit pauses at value one for six readings. During this period when no change can be seen in the first column the second column goes from nine down to one in a well defined path. The most significant digit pauses at value two for three readings. Again the change can be seen in the second column. The rate of change with respect to the ordinate (i.e. the up-and-down position) appears to be greater, the step size being three. It is convenient to read the step size since a change from an "I" to an "X" or "X" to "I" must be an odd value step. The most significant digit pauses at value three also for three readings. Again the change can be seen in the second column. The rate of change with respect to the ordinate is greater, with the step size being four. It is convenient to read the step size since a step without change of letter must be even.

Descartes chose left-to-right as the positive direction and this seems to have been accepted. The inventors find no difficulty in accepting this.

Descartes choose down-to-up as the positive direction. While many charts, such as those produced by strip chart recorders, are read as time increasing in the down-to-up direction, many tables produced on typewriters are read as time increasing from up-to-down. Either system may be used with this invention.

Returning to FIG. 5, it is constructed with the ordinate increasing from up-to-down. In order to determine the sign of the rate-of-change of the abscissa it is necessary to know this. It was previously stated that each line was related to the line above it by the factor 0.8912 but to define the ordinate the equation must be written, and to write the equation we must assign x as the value of the abscissa and y as the value of the ordinate.

The equation is $$x = 9\,999\,999\, e^{-0.115186\, y}$$

where e is the base for natural logarithms.

| | |
|---|---|
| For the top line | $y = 0$<br>$e^{-0} = 1$<br>$x = 9\,999\,999$ |
| For the second line | $y = 1$<br>$e^{-0.115186} = 0.8912003$<br>$x = 8\,912\,002$ |
| For the third line | $y = 2$<br>$e^{-0.115186 \cdot 2} = 0.7942380$<br>$x = 7\,942\,380$ |
| For the last line | $y = 140$<br>$e^{-0.115186 \cdot 140} = 0.0000000$<br>$x = 0\,000\,000$ |

Once the direction in which the ordinate is increasing is known, one can determine the sign of the rate-of-change of the abscissa. Here it is negative. The rate-of-change of the abscissa is about 1,000,000 at the top and only 0.2 at the bottom, or a range of 5,000,000. The range of the abscissa itself is from 9,999,999 to 1 or essentially 10,000,000. These ranges are noteworthy especially since the width of paper required is only 2¼ inches with the magnified symbol in FIG. 5 and would be only 1⅛ inch with unmagnified symbols which will probably be used.

Figure 6:
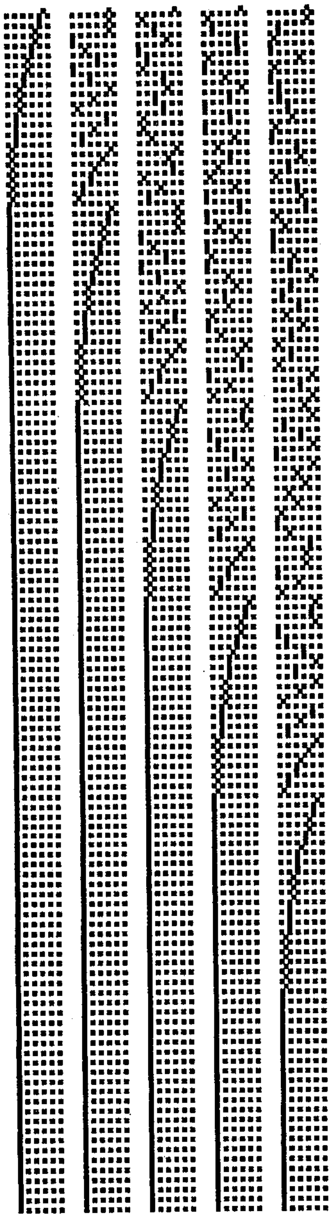
FIG. 6 shows the decaying exponential function shown in FIG. 4 as a graphic printout from a computer.

FIG. 6 is similar to FIG. 5 and uses approximately the same numerical quantities. FIG. 6 was made by a printer in response to a computer (Commodore PET 2001 Series with Axiom EX-820 Microplotter), which also solved the equation for successive values of y without attention. The limited width of the printer tape limited the readout to five decades. All columns are complete since no laborious handwork was involved.

Figure 7:
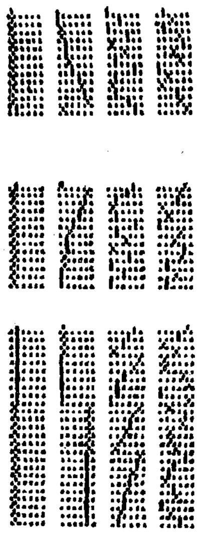
FIG. 7 is a representation of various portions of consumer price index data from the information shown in Table I as done by hand drawing.

FIG. 7 shows three groups of tabulations in accordance with the invention of selected portions of data found in Table 1. (Standard & Poor's Stock Guide, September 1979, page 258). Table I gives in four digits the value of the Cost Of Living Index otherwise known as the Consumer Price Index (CPI) starting with January, 1967 and ending with July, 1979.

The symbols in each group were drawn by hand using for tools, a Parker Jotter ball pen (black fine). Plus the ruler side of a pocket sliderule which has 1/32 inch graduations, plus the shoulder on the slide part of the same sliderule (for the line spacing). For FIG. 7 there has been no magnification so the random size and location of the dots (unavoidable with free hand work) can be seen without diminution or augmentation.

The upper group of symbols in FIG. 7 is a plot of CPI yearly using the July value for each year from 1967 to 1979, with July, 1967 at the top of the set of columns. There is not much change in the column at the left (the most significant digit) but the next column shows a line advancing to the right (increasing) with increasing time. This tells us the CPI is increasing and does this without the use of arithmetic, mental or otherwise. The line is noticeably curved in a direction that shows us that the rate of change of CPI with time is also increasing. Again this is evident without the use of arithmetic, mental or otherwise.

The middle group of symbols in FIG. 7 is again a plot of CPI on a yearly basis but with July, 1967 at the bottom and with July, 1979 at the top of the set of columns. It is essentially a mirror image of the first group. The same facts are shown as are shown in the top group of symbols. The reader must know in which direction the ordinate is increasing.

The lowest group of symbols in FIG. 7 is a plot of CPI by month with July, 1977 at the bottom of the set of columns and with July, 1979 at the top. There is not much change in the two columns at the left (the most significant digits) but the third column shows a line increasing with increasing time. The line seems to leave the column at the right, immediately reappear at the left, and then continue its increase. In all there are four lines each of which shows that the CPI continued to increase with time over the two year period. The four lines are not parallel to each other, in fact the slope changes from line to line, showing that the rate of change of CPI had observable increases over this shorter period (two years instead of twelve years). Again this is evident without the use of arithmetic, mental or otherwise.

It is worthy of note that data presented with these symbols allows the reader to easily select signal from noise because the eye and brain of man can spot a significant pattern in any of the four decades where a pattern exists.

The ratio of height to width of the symbols of this invention is less than the ratio of height to width of the conventional Arabic symbols. This can be observed by comparing the shape of the symbols in FIG. 7 with the shape of the conventional Arabic symbols in Table 1. Although the proposed symbols are wider than the Arabic symbols they are not as high. This smaller height of the proposed symbols is a great advantage in doing the task for which they are intended, the graphical presentation of a series of numbers. For example, a vertical column for presenting the Consumer Price Index for twelve years with monthly steps would be 12 inches high using conventional Arabic symbols whereas with the proposed symbols it would be only 6 inches. A conventional 11 inch sheet of paper would not contain the column of conventional Arabic symbols but it would readily contain the column of the proposed symbols.

As elsewhere stated, the inherent strength of the Arabic number system has never yet been fully realized because of the lack of a set of symbols such as are being proposed.

A close inspection of the symbols of FIG. 7 discloses the dots are not squares as in previous figures. The shape of the dots in FIG. 7 can be better described as round or oval resulting from freehand marking with a ball point pen. The bottoms of each of the six dots in each row are well aligned because each dot was made with a downward stroke of the ball pen and the stroke was terminated when the pen was stopped by the edge of the ruler portion of the pocket slide rule. The tops of the dots are not as well aligned because the locations of the tops are the result of coordination of the hand and the eye, which is less than perfect. It is not surprising that the tops and the bottoms of the dots are rounded since the ball is a sphere and its contact with the paper is a round area. The width of the dots is not uniform since the amount of ink on the ball is not always the same. The horizontal spacing of the dots and the alignment of each row with the dots in the preceding row is less than perfect as the result of imperfect coordination of the hand and the eye. In spite of the considerable departure from the ideal of the symbols in FIG. 7 they have not lost their analog or digital connotations. The "I" symbols for the even digits are easily distinguished from the "X" symbols for the odd digits. It is gratifying to know that it is not necessary to always have a machine, such as a typewriter or a printer, to make symbols which perform the function for which they are intended.

Figure 8:
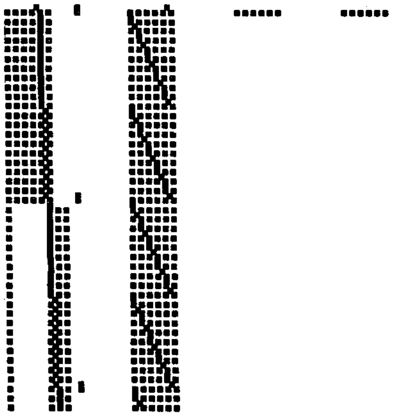
FIG. 8 shows the first embodiment of this invention used to represent a numerical progression from 7.9 to 12.1 in increments of tenths, with extension symbols as an abbreviated way of extending the plot above 9.9.

FIG. 8 shows the series of numbers from 7.9 through 12.1 in increments of one-tenth as represented by a space-saving version of the first embodiment of this invention. The plot of this function starts at 7.9 (at the top) and increases uniformly, which is shown by the constant slope in the second decade. After 9.9 there is a problem because we have come to the end of the scale. Another decade could be added which would allow representations of quantities up to and including 99.9 if needed. If, however, the extension above 9.9 is expected to be small, extension symbols may be used as shown in FIG. 8. The extension symbols can be of the same width as the zero-based symbols or they can be truncated as shown in FIG. 8. In either case the extension symbols are located to the right so the left row dot of each extension symbol is vertically (up-and-down) aligned with the right dot of the zero-based symbols (used up to and including 9.9). FIG. 8 shows that the first (top) extension symbol is formed with the information dot above the left row dot of this extension symbol. This would be a zero in a zero-based symbol but since it is in an extension symbol it is a 10.

In order to avoid confusion, the dot pattern for the zero-based symbols is discontinued when the number in the most significant decade exceeds 9.

When the extension symbols and the zero-based symbols both are in the field of view it is clear that extension symbols are indeed extension symbols. When only the extension symbols are in the field of view there is need to identify them as extension symbols. This need has been satisfied in FIG. 8 by having a single dot (vertically) aligned with the left dot of the zero-based symbols (real or virtual). The column of single dots as shown in FIG. 8 form a "tail" on the zero-based symbols, and, thus, have been called tell-tails.

A desireable result of the use of the extension symbols in FIG. 8 is their uniform and unidirectional appearance in the most significant line. This is appropriate to the intent of the symbols, i.e., to have an analog connotation.

FIG. 8 also shows three isolated vertical dashes. These are decimal points. The space between the decimal point and the nearest row dot is preferably never less than twice the space between the row dots. This is considered desireable to avoid confusion. The decimal points can be one or two dots high (as shown in FIG. 8) or more than two dots high. The decimal points can be contiguous or there can be vertical spacing between them as shown in FIG. 8. The spacing between the decimal points can be used as an aid in reading the change in value of the ordinate.

In order to make provision for decimal points between any of the decades it is desireable to leave space between the decades. If the desirable minimum space between the decimal point and any decade is twice the space between the row dots and if the width of the decimal point is approximately equal to the width of a row dot, then the space between decades must be five times the space between the row dots.

Since the width of the space between the row dots is approximately equal to the width of each row dot, the space between decades is adequate when it is equal to or more than the distance of two row dots in any row together with the three spaces associated with those two dots.

Figure 9:
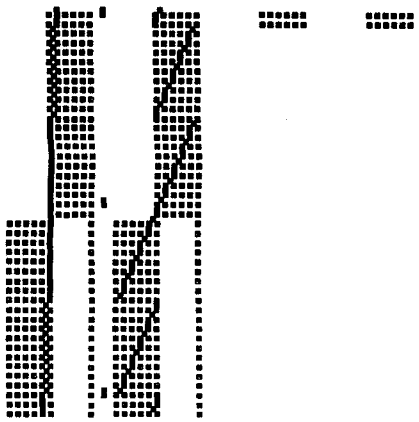
FIG. 9 shows the first embodiment of this invention used to represent a numerical decline from 2.1 to −2.1 in decrements of tenths, using decimal points and negative symbols. Table 1 shows information used in generating the representations in FIG. 7.

FIG. 9 is the plot of a function which starts at 2.1 (at the top) and continues through −2.1, decreasing uniformly in decrements of one-tenth which is shown by the second decade. After 0.0 there is a problem because the end of the normal scale for positive values has been reached.

The procedure with conventional Arabic symbols is to place a negative sign at the left of the symbols and then start counting back up. To do this with the symbols of this invention as explained in the first basic embodiment would be contrary to the intent of the symbols—to give a true analog connotation—because there would be an abrupt change of slope at zero. To avoid the abrupt change of slope it is necessary to provide a continuation of the curve into the negative domain with negative symbols and this must be done for each decade at zero. The negative symbols are the mirror images of the positive symbols and are located horizontally to the left, so the right dot of each negative symbol in each decade is vertically aligned with the left dot of the positive symbols in that decade. FIG. 9 shows the first negative symbol in the most significant decade formed with the information dot above the right row dot. This is a negative zero. In an analog connotation this is the same as the positive zero, so it is not surprising that the information dot has not moved horizontally.

The first negative symbol in the decade of next significance is formed with the information dot above the right space. If it were a positive symbol it would be a nine but being a negative symbol it is a negative one. This puts the information dot in a position which is an extension of the line above it. The next step repeats the negative zero in the most significant decade. For the decade of next significance the information dot is above the next to right row dot which is a negative two. These symbols continue the lines and thus continue the slope.

In order to avoid confusion the dot pattern for the positive symbols is discontinued when the number becomes negative. When the negative symbols and positive symbols both are in the field of view it is clear that the negative symbols are indeed negative numbers. When only the negative symbols are in the field of view there is need to identify them as negative symbols. This need has been satisified in FIG. 9 by having a single dot aligned (vertically) with the right dot of the positive symbols (real or virtual) and this is done for all of the decades. Columns of these vertically aligned single dots are shown in FIG. 9; since they form "tails" on the positive symbols they have been called tell-tails.

FIG. 9 shows decimal points which were also shown and explained with reference to FIG. 8.

While the previous description and figures have employed square or rectangular type dot elements and particular sizes for decades and/or information dots, it is to be understood that other shapes of dot elements and a variety of sizes for dots and decades may also be used to practice this invention. For example, in the first embodiment the information dots may be placed below the decade of six dots instead of above the row.

This invention may be implemented by use of a computer. A computer may be programmed to print out numerical data or create a CRT display utilizing the previously described system.

Other variations of the systems and numerical displays which are the subject of this invention may be developed which are also within the spirit and scope of this invention.

The proposed symbols have value because of the Arabic number system. Otherwise stated the inherent strength of the Arabic number system has never yet been fully realized because of the lack of a set of symbols such as are being proposed.

We claim:

1. In a method for recording successive magnitudes of a quantity in both digital and analog form using as required any one of ten symbols each of which corresponds to one of the Arabic digits zero through nine inclusive, the successive magnitudes of said quantity are recorded sequentially in a column, the improvement wherein the maximum width of each of said symbols is established by a row of six dots extending from left to right with five equal spaces therebetween, the separation between dots being substantially equal to the width of the dots, thus establishing eleven quantitized locations, the steps of producing each symbol in digital form by selecting and identifying one of said locations, said identification being accomplished by a modification of each said row of six dots by adding one dot or deleting a maximum of two dots, to form a symbol having conformity in width, and stacking said selected symbols to form a well defined column, whereby any changes in magnitude of the quantity recorded in digital form by the symbols in the column are also apparent in analog form without deciphering the symbols.

2. The method of claim 1 wherein said modification is limited to the addition of a single dot located just above one of said row dots for one of the even Arabic digits 0,2,4,6, and 8, or the addition of a single dot located just above one of the spaces between said row dots for one of the odd Arabic digits 1,3,5,7 and 9.

3. The method of claim 1 wherein said modification is limited to the addition of a single dot located just below one of said row dots for one of the even Arabic digits 0,2,4,6, and 8, or the addition of a single dot located just below one of the spaces between said row dots for one of the odd Arabic digits 1,3,5,7, and 9.

4. The method of claim 2 or 3 wherein said dots and spaces are rectangular with the length of all sides similar, so that when the symbols are assembled closely in columns, the dot for each even digit joins with the row dot above it and the row dot below it to assume the shape of the letter "I", and the dot for each odd digit joins with the row dots at its four corners to assume the shape of the letter "X".

5. The method of claim 1 wherein said modification is made in the same line as said row dots, and a dot is added in one of the spaces between said row dots for the odd Arabic digits 1,3,5,7, and 9, and a row dot is emphasized by deletion of any neighboring row dot for the even Arabic digits 0,2,4,6, and 8.

6. The method of claim 5 wherein said dots and spaces are rectangular with the length of all sides similar, and wherein the added dot used for an odd number is emphasized by becoming the center of a dash, the ends of which are the adjacent row dots.

7. The method of claim 5 wherein said dots, including any row dots and any added dot for each symbol, are augmented in height to facilitate reading by a photoelectric device.

8. The method of claim 1 comprising the further steps of placing at least one additional symbol to the left or right of a column of said symbols, and spacing said additional symbol at a distance greater than that between said row dots, whereby decades of greater or lessor significance are represented.

9. The method of claim 8 comprising the further step of establishing a space between decades adequate for the inclusion of a decimal point, said space being at least equal to the distance of two dots in any row together with the three spaces associated with those two dots.

10. The method of claim 9 comprising the further step of constructing a plurality of decimal points so that the up-and-down spacing of said decimal points is greater than the up-and-down spacing of said symbols in each column, and so that the left-to-right width of said decimal points is about the same as the width of said dots in said symbols.

11. The method of claim 8 comprising the further steps of constructing extension symbols for expressing a number greater than 9 in the most significant decade, locating the left dot of said extension symbols in vertical alignment with the right dot of the zero-based symbols of said column, and discontinuing the dot pattern for the zero-based symbols when the number in the most significant decade exceeds 9.

12. The method of claim 11 comprising a further step of constructing a single dot vertically aligned with the left dot of the zero-based symbols when the dot pattern in the zero-based symbols has been discontinued.

13. The method of claim 8 wherein positive and negative numbers are displayed by: providing negative symbols constructed as mirror images of said positive symbols and locating said negative symbols to the left of said positive symbols so that the right dot of each said negative symbol in each decade is vertically aligned with the left dot of a positive symbol in that decade, and discontinuing the construction of the dot pattern of said positive symbols when negative symbols are being constructed.

14. The method of claim 13 including discontinuing the dot pattern for all said positive symbols and constructing a single dot for each decade vertically aligned with the right dot of all the positive symbols for that decade.

* * * * *